(12) United States Patent
Guo et al.

(10) Patent No.: US 12,039,059 B2
(45) Date of Patent: Jul. 16, 2024

(54) READ-ONLY SECURITY PROTECTION

(71) Applicant: SAP SE, Walldorf (DE)

(72) Inventors: Chunxian Guo, Shanghai (CN); Jinghui Wu, Shanghai (CN); Jiqi Mi, Shanghai (CN); Yuneng Wu, Shanghai (CN)

(73) Assignee: SAP SE, Walldorf (DE)

( * ) Notice: Subject to any disclaimer, the term of this patent is extended or adjusted under 35 U.S.C. 154(b) by 383 days.

(21) Appl. No.: 17/567,692

(22) Filed: Jan. 3, 2022

(65) Prior Publication Data

US 2023/0214505 A1    Jul. 6, 2023

(51) Int. Cl.
*G06F 21/60* (2013.01)
(52) U.S. Cl.
CPC ................... *G06F 21/604* (2013.01)
(58) Field of Classification Search
CPC .................................................. G06F 21/604
USPC .......................................................... 726/26
See application file for complete search history.

(56) References Cited

PUBLICATIONS

Wikipedia.org [online], "SHA-2" created on Mar. 2005, [retrieved on Nov. 23, 2021], retrieved from : URL <https://en.wikipedia.org/wiki/SHA-2>, 9 pages.

*Primary Examiner* — Mohammed Waliullah
(74) *Attorney, Agent, or Firm* — Fish & Richardson P.C.

(57) ABSTRACT

The present disclosure involves systems, software, and computer implemented methods for read-only security protection. One example method includes receiving, from a client device, an on-change request to change an editable leading field from a first editable leading field value to a second editable leading field value. The editable leading field is referenced in an on-change rule. The on-change request includes a first security key and the client device is not allowed to modify the read-only target field. The on-change rule is executed to change the read-only target field from a first read-only target field value to a second read-only target field value based on the second editable leading field value. A second security key is generated based on at least the second read-only target field value and provided to the client device in response to the on-change request.

20 Claims, 10 Drawing Sheets

| | 302 | 304 |
|---|---|---|
| | (User-Changable) Job Title | (Read-only) Salary |
| 306 | Junior Developer | 8000 — 308 |
| 310 | Developer | 10000 — 312 |

FIG. 3

2. Scenario 2 (Hacked case: hack of the read-only fields when saving)

2.1 End user changes field2.value from "aaa" to "bbb" to trigger the on-change rule

- Generated hash(K1): 29493645772574447959173897306602970975716950583191304
  3016538228795898839601105313902160169912958121918062269

2.2 Click "Save" button, and hack the request, set the field1 value to be "789".

Validation: backend will regenerate the security key based on the input from UI, and compare with the security key passed from UI.

| readonly field ID: field1<br>readonly field value: 789 | last modified<br>time | | UUID | login user ID | target user ID |
|---|---|---|---|---|---|
| field1789field2bbb | 1303714909000 | 17g999c5b1e-61aa-4042-9242-7d7a40f2ee33 | admin | aarnold1 |
| | | record ID | | | |
| leading field ID: field2<br>leading field value: bbb | | | | | |

- Generated hash(K2): 31681475241794878974937470612690641085843815599848371
  6111205213046557630541898452024966660923154259629497

K1 is not equal to K2, so this is an illegal request. The system will reject this request.

FIG. 8

READ-ONLY SECURITY PROTECTION

TECHNICAL FIELD

The present disclosure relates to computer-implemented methods, software, and systems for read-only security protection.

BACKGROUND

An architecture that can be used for application development is the representational state transfer (REST) architecture. The REST architecture is based on principles such as client-server, cacheability, and statelessness. When using a statelessness approach, the server does not retain session information. Rather, session data can be sent to the server by a client. The server can understand each packet of session data in isolation, without requiring information from previous packets in the session.

SUMMARY

The present disclosure involves systems, software, and computer implemented methods for read-only security protection. An example method includes: receiving, from a client device, an on-change request to change an editable leading field of an entity instance from a first editable leading field value to a second editable leading field value, wherein the editable leading field is referenced in an on-change rule that specifies that a value of a read-only target field of the entity instance is to be changed in response to a change in the editable leading field, and wherein the on-change request includes a first security key, and wherein the client device is not allowed to modify the read-only target field; executing the on-change rule to change the read-only target field from a first read-only target field value to a second read-only target field value based on the second editable leading field value; generating a second security key based on at least the second read-only target field value; providing the second security key to the client device in response to the on-change request; receiving, from the client device, a first save request to save the entity instance, wherein the first save request includes a third security key, a third read-only target field value, and a third editable leading field value; generating, in response to the first save request, a fourth security key based at least on the third read-only target field value; comparing the fourth security key to the third security key included in the first save request; and determining to accept the first save request in response to determining that the fourth security key matches the third security key included in the first save request.

Implementations may include one or more of the following features. A determination can be made to reject the first save request in response to determining that the fourth security key does not match the third security key included in the first save request. The first security key can be provided to the client device when an edit page for editing the entity instance is provided to the client device. The first security key can be validated before executing the on-change rule. The fourth security key can be generated based on the third read-only target field value included in the first save request and the third editable leading field value included in the first save request. The fourth security key can be based on a hash of a source string that includes the third read-only target field value and the third editable leading field value. The fourth security key can be based on the source string and a session-based secret key. The source string can include an identifier of the read-only target field, the third read-only target field value, an identifier of the editable leading field, and the third editable leading field value. The source string can include at least one entity instance identifier, a last modified time of the entity instance, a login user identifier of a user associated with a current session, and a target user identifier, wherein the target user identifier corresponds to a target user associated with the entity instance. The third security key included in the first save request can match the second security key provided to the client device in response to the on-change request. The first save request can include a change to an editable field that is not a leading field. The third security key included in the first save request can be a hacked security key that does not match either the second security key provided to the client device in response to the on-change request or the fourth security key generated in response to the first save request. The third read-only target field value can be a first hacked value that does not match the second read-only target field value and the fourth security key might not match the third security key included in the first save request based at least on the first hacked value not matching the second read-only target field value. A second save request can be received, from the client device and before the on-change request. The second save request can include the first security key, the first read-only target field value, and an editable field value of an editable field. A fifth security key can be generated based on at least the first read-only target field value. The fifth security key can be compared to the first security key. The second save request can be accepted and the entity instance can be saved with the editable field value, in response to determining that the fifth security key matches the first security key. The second save request can be rejected in response to determining that the fifth security key does not match the first security key.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 is a table that illustrates a changing of a field based on an on-change rule.

FIG. 8 is a diagram that illustrates an on-change scenario in which a hacked request is declined.

DETAILED DESCRIPTION

Figure 1:
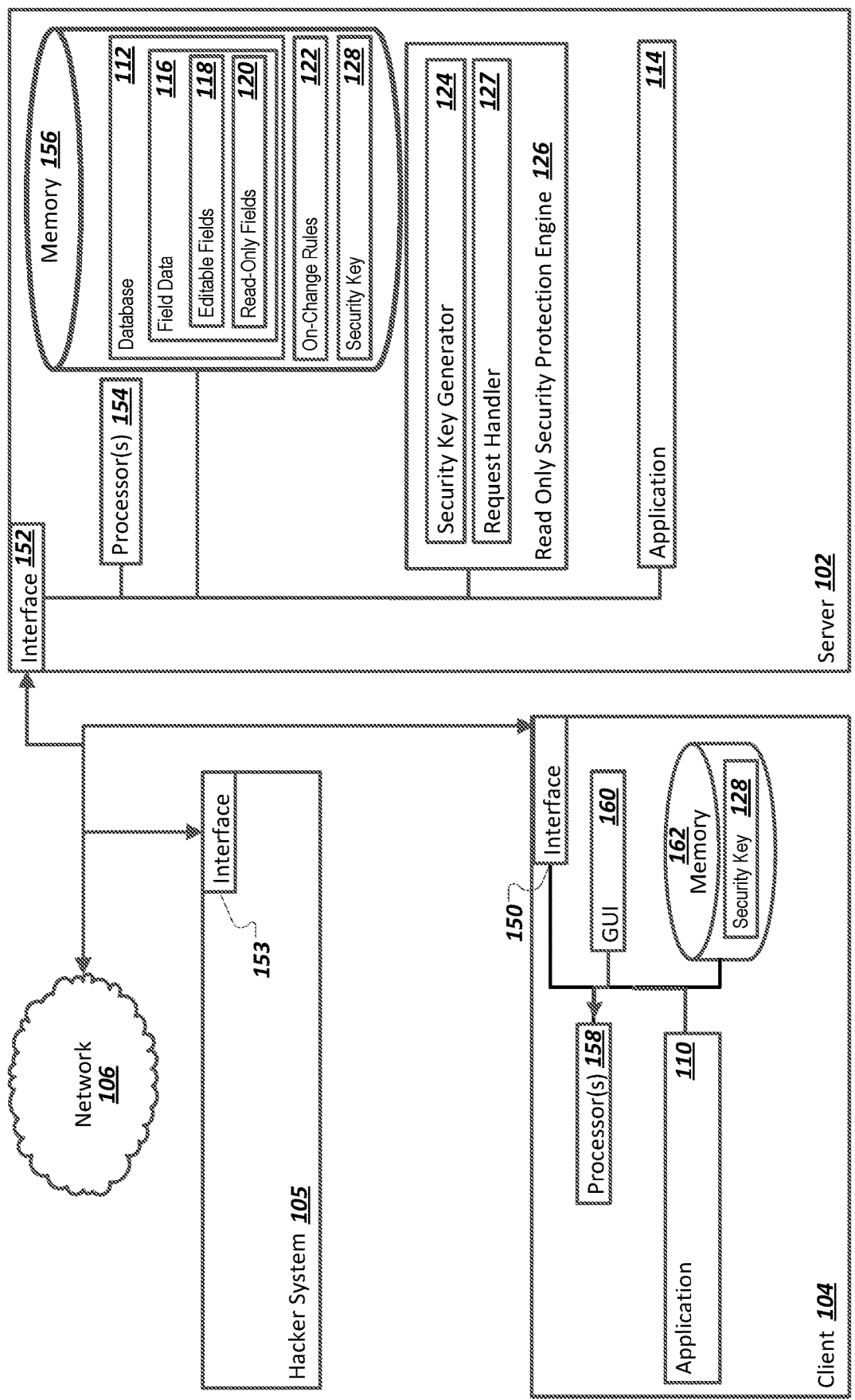
FIG. 1 is a block diagram illustrating an example system for read-only security protection.

An application or system can enable end users to edit entity data of an entity instance. An entity instance can be, for example, an object instance or a database record. The system can provide an edit page or user interface that enables a user to modify field data for different fields of the entity instance. For some systems, role-based authorization may be employed, to restrict certain users or certain types of users from being able to modify certain types of entity instances, certain entity instances, or certain fields of an entity instance. Accordingly, in some cases, some entity instance fields may be read-only during a particular edit session for the current user.

Fields may also be read-only with respect to user modification for reasons other than role-based permissions. For example, some fields may be derived fields whose value is determined based on value(s) of one or more other fields of the entity instance. The user may be able to view a derived read-only field, but may be prohibited from directly changing the value of the derived read-only field. A derived field can be referred to as a target field. A field on which the value of a target field is based can be referred to as a leading field. For instance, a change in the leading field can trigger a system change to the target field. That is, although the target field is considered read-only with respect to direct user modification, the system can legally change the value of the target field in response to a change in a value of a leading field.

In some systems, backend/frontend interaction is designed in a stateless manner corresponding to the REST architecture. In such systems, the backend may not be able to distinguish between legal system changes to read-only target fields performed in response to changes in leading fields or unauthorized requests (e.g., hacked requests) to change a read-only field. A read-only security protection engine can be configured to provide an efficient way to handle protection of read-only fields from unauthorized modification while still allowing authorized system changes to target fields. The read-only security protection can protect against different kinds of malicious attacks, including hacking of read-only fields, interception or blocking of on-change requests, and replay attacks.

The read-only security protection can be implemented without using backend storage or cache storage. Accordingly, read-only security protection can be provided with less server overhead as compared to approaches that may rely on backend storage. For example, the read-only security protection can include client devices storing state information and passing of state information between the read-only security protection engine and client devices. The read-only security protection approach of keeping state information client-side without using backend storage can enable greater scalability as compared to solutions that may use backend storage. The read-only security protection approach does not require or use backend storage. State information can be used during edit transactions in which long-term state persistence is not required. Passing of state information between server and client devices can be implemented by modifying existing user interface logic pathways. Other details and advantages are discussed below.

FIG. 1 is a block diagram illustrating an example system 100 for read-only security protection. Specifically, the illustrated system 100 includes or is communicably coupled with a server 102, a client device 104, a hacker system 105, and a network 106. Although shown separately, in some implementations, functionality of two or more systems or servers may be provided by a single system or server. In most implementations, the hacker system 105 will be a separate system from the client 104/server 102 system as the hacker system is not authorized to access the data in either client 104 or server 102. However, in other implementations, a hacker system 105 may be integrated into the system as a way of conducting tests to determine the robustness of system 100. In some implementations, the functionality of one illustrated system, server, or component may be provided by multiple systems, servers, or components, respectively.

An end user can use a client application 110 on the client device 104 to edit field data of an entity that is stored in a database 112 managed by the server 102 (or another server). The client application 110 can be a client-side version of a server application 114. The database 112 can include field data 116 that includes read-only fields 118 and editable fields 120. An end user can edit the editable fields 120 in the client application 110. The end user can view but not edit the read-only fields 118 in the client application 110. Although the read-only fields 118 are not user-editable, the server application 114 can determine to modify a read-only field 118 in response to triggering of an on-change rule 122. The on-change rule 122 can specify that a read-only field value is to be changed in response to a change in an editable field 116, for example.

To enable legal system changes in response to on-change rules 122 but prevent unauthorized requests to change the read-only fields 120, a security key generator 124 of a read-only security protection engine 126 can generate a security key in response to requests sent by the client device 104 and received by a request handler 127. As described in more detail below, the server 102 can provide the security key in responses that are sent to the client device 104. The client device 104 can store the received security key 128 at the client device. The client device 104 can include the security key 128 in subsequent requests to ensure the integrity of the requests. For example, the security key generator 124 can regenerate a security key based on information in the request and compare the regenerated security key to a copy of the security key 128 included in the request. If the regenerated security key matches the security key included in the request, the request handler 127 can accept and handle the request. If the regenerated security key does not match the security key included in the request, the request handler 127 can reject the request based on determining that the request is not a valid request.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, and 153 are used by the client device 104, the server 102, and the hacker system 105, respectively, for communicating with other systems in a distributed environment—including within the system 100—connected to the network 106. Generally, the interfaces 150, 152, and 153 each comprise logic encoded in software and/or hardware in a suitable combination and operable to communicate with the network 106. More specifically, the interfaces 150, 152, and 153 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 110. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the client application 110. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2A:
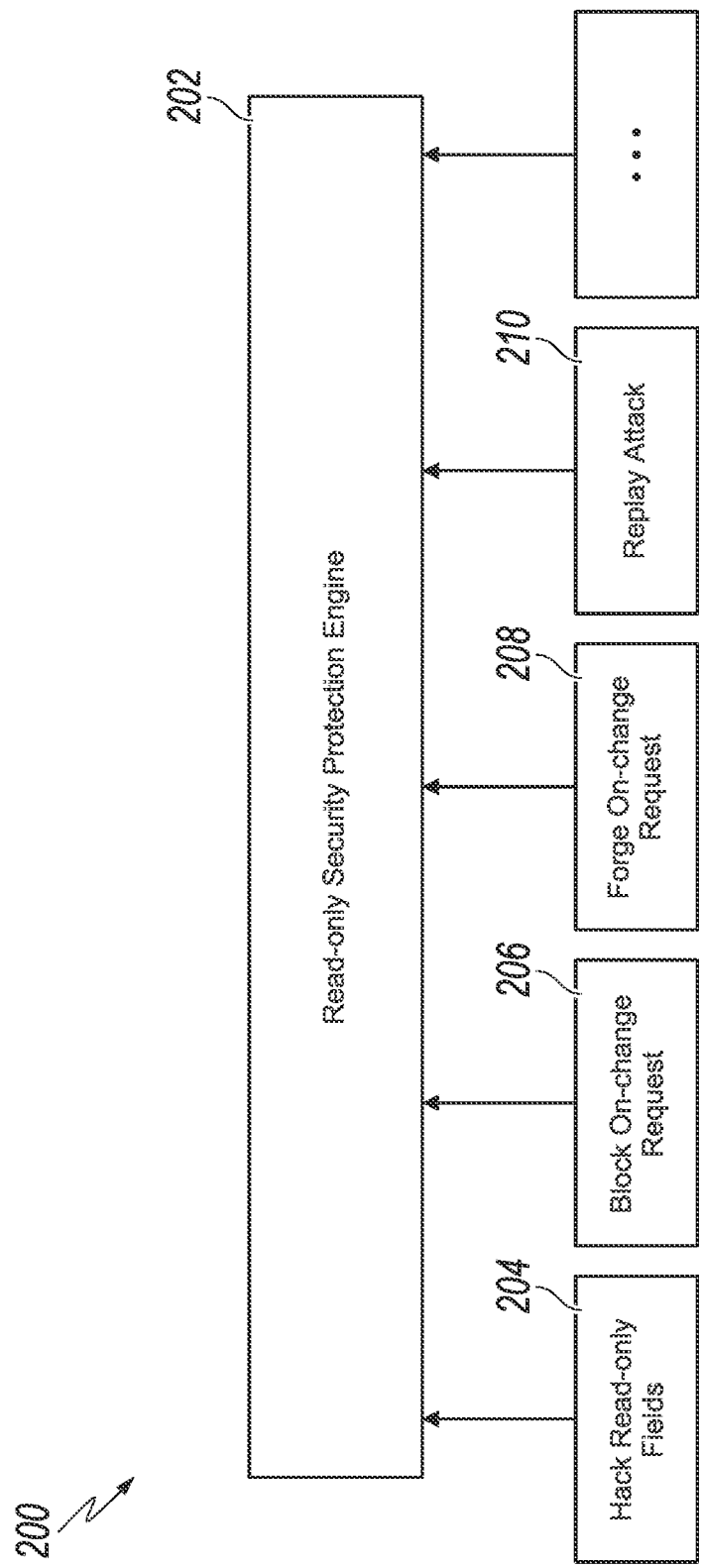
FIG. 2A is a diagram that illustrates functionality of a read-only security protection engine.

FIG. 2A is a diagram 200 that illustrates functionality of a read-only security protection engine 202. As described in more detail below, the read-only security protection engine 202 can protect against hacks of read-only fields 204, blocking of on-change requests 206, forging of on-change requests 208, and other types of attacks. Hacks of read-only fields 204 can be prevented by detecting a difference between a security key that is generated from a hacked read-only field and a security key previously provided to a client device. Blocking an on-change request 206 can correspond to a hacker changing a leading field but blocking an on-change request that a client attempts to send to the read-only security protection engine 202. The read-only security protection engine 202 can detect the blocking of the on-change request due to a security key mismatch. The read-only security protection engine 202 can also detect forging of on-change requests 208 based on detecting a security key mismatch. Comparing security keys and detecting security key mismatches is described in more detail below. The read-only security protection engine 202 can also detect replay attacks 210. Replay attacks 210 can occur when a hacker intercepts a communication and then fraudulently delays or resends the communication.

Figure 2B:
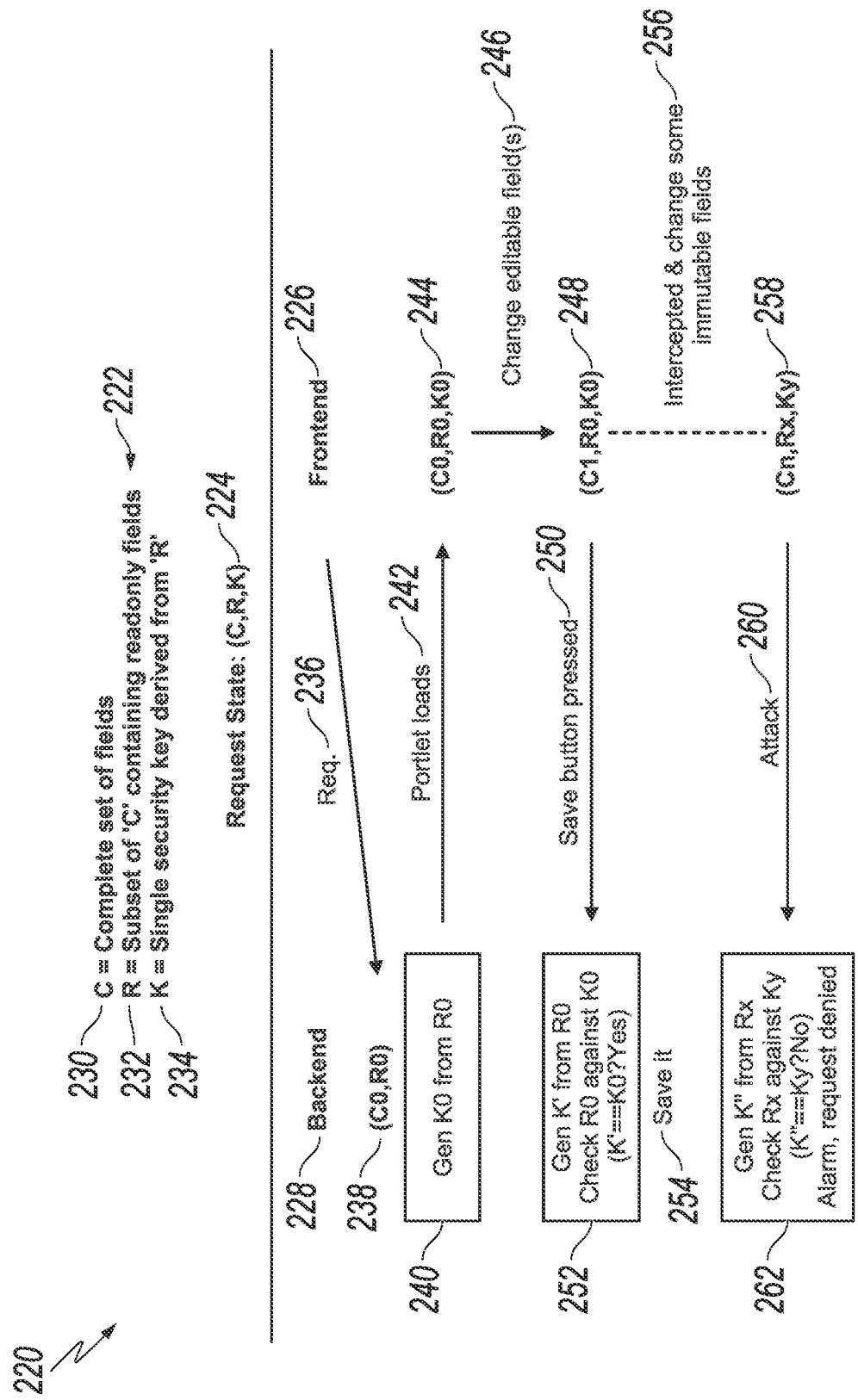
FIG. 2B is a flowchart that illustrates read-only security protection.

FIG. 2B is a flowchart 220 that illustrates read-only security protection. As indicated in a legend 222, a request state 224 for a request sent from a frontend 226 (e.g., the client device 104) to a backend 228 (e.g., the server 102) can include a "C" portion 230 that includes a complete set of request fields, a "R" portion 232 that includes a subset of read-only request fields, and a "K" value 234 that is a security key that is derived from the read-only subset.

The frontend 226 can send a request 236 to the backend 228 for an edit page for editing an entity instance. In response to the request 236, the backend 228 can generate an initial state 238 that includes a first read-only subset R0 that is a subset of a first complete set of entity instance fields C0. At 240, the backend 228 can generate a first security key K0 based on the read-only subset R0. Generating security keys based on read-only subsets can correspond to generating a security key based on a source string that includes read-only subset information and other information, as described below with respect to FIG. 5. At 242, the backend 228 can provide a response 244 to the request 236 to the frontend 226 that includes the first complete set of fields C0, the first read-only subset R0, and the first security key K0. A portlet can load at the frontend 226 using data in the response 244, for example.

At 246, a user changes one or more editable fields using the edit page, for example. The edit page can prohibit the user from changing any read-only fields. The changing of one or more editable fields results in a changed state 248 that includes a second complete set of fields C1 (e.g., changed from the first complete set of fields C0). The changed state 248 includes a same first read-only subset R0 and a first security key K0 as received from the backend 228 in the response 244.

At 250, the changed state 248 is sent from the frontend 226 to the backend 228, such as in response to a user selecting a save button or performing some other action to request saving of the changes to the editable fields.

At 252, the backend 228 receives a copy of the changed state 248 from the frontend 226, retrieves the first read-only subset R0 from the received copy of the changed state 248, generates a security key K' from the retrieved first read-only subset and determines whether the security key K' matches the first security key K0 that the backend 228 generated at operation 240. At 254, in response determining that the security key K' matches the first security key K0 generated at operation 240, the backend 228 saves the changes to the editable fields at the backend 228.

As another example, the backend system 228 can detect if a hacker had intercepted and modified data (e.g., read-only fields) being sent from the frontend 226. For instance, suppose at 256 that a hacker system intercepted the sending of the changed state 248 from the frontend 226 to the backend 228. The hacker system may change the changed state 248 to be a hacked state 258 that includes a Cn complete set of fields (which may be changed by the hacker from the C1 complete set of fields), a Rx read-only subset (which may be changed by the hacker from the R0 read-only subset), and a Ky security key (which may be changed by the hacker from the K0 security key).

At 260, the backend 228 can receive the hacked state 258 (e.g., as a security attack from the hacker system that is illegitimately attempting to request modification of read-only field data as specified in the Rx read-only subset). At 262, the backend 228 generates a K" security key from the received Rx read-only subset). The backend 228 can compare the K" security key generated at step 260 to the received Ky security key. The backend 228 can generate an alert or alarm condition when the K" security key does match the received Ky security key. Accordingly, the backend 228 can deny the request from the hacker system.

FIG. 3 is a table 300 that illustrates a changing of a field based on an on-change rule. The table 300 includes information for an editable (e.g., user-changeable) job title field 302 and a read-only salary field 304. A user can change the editable job title field 302 but can't change the read-only salary field 304. For a given record, the value of the read-only salary field 304 is based on the value of the editable job title field 302. Accordingly, the read-only salary field 304 can be considered as a target field and the editable job title field 302 can be considered as a leading field. As described in more detail below, the read-only security protection engine can allow a system-performed change on a target field while preventing direct user modification of the target field.

For example, when the value of the editable job title field 302 is "Junior Developer" 306 the value of the read-only salary field 304 is 8000 (308) and when the value of the editable job title field 302 is "Developer" 310 the value of the read-only salary field 304 is 10000 (312). When the value of the editable job title field 302 is changed, an on-change event can be triggered and system handling of the on-change event can include setting the value of the read-only salary field 304 to a new value based on the current value of the editable job title field 302.

In general, leading fields can be referenced in an on-change rule. An on-change rule can be used to add application logic to determine the outcome of a change made to particular data in the system. An on-change rule can be defined to trigger certain actions when data is changed in the system, for example. An on-change rule can generally follow a pattern of: "If this data is changed in a certain way, then the system reacts in this way." That is, an on-change rule can define which actions the system performs when specific conditions are met.

A leading field can be referred to in a condition of an "if" portion of an on-change rule. For example, an on-change rule can include logic that follows a pattern of "if fieldX=valueY". A target field can be referenced in a "then" portion of an on-change rule. The "then" portion can define how the system responds when a condition in the "if" portion of an on-change rule is met. For example, an on-change rule can include a portion of "then set fieldY value to valueZ". For example, after an on-change rule is configured, a value of a target field of fieldY be set to "valueZ" in response to a value of a leading field fieldX being set to a value of "valueY".

Figure 4:
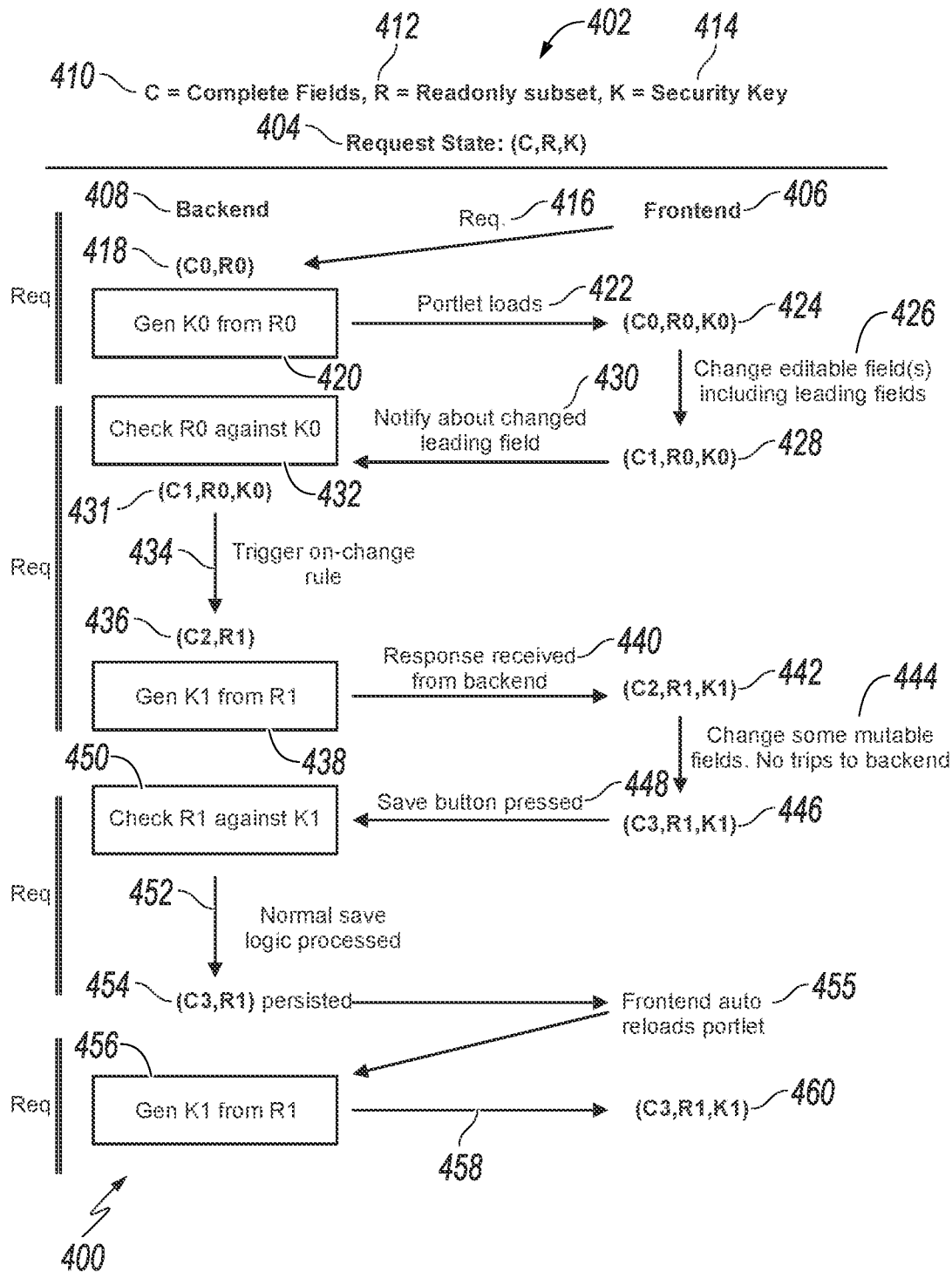
FIG. 4 is a flowchart that illustrates read-only security protection for an on-change rule.

FIG. 4 is a flowchart 400 that illustrates read-only security protection for an on-change rule. Similar to the flowchart 220 described above with respect to FIG. 2B, as indicated in a legend 402, a request state 404 for a request sent from a frontend 406 (e.g., the client device 104) to a backend 408 (e.g., the server 102) can include a "C" portion 410 that includes a complete set of request fields, a "R" portion 412 that includes a subset of read-only request fields, and a "K" value 414 that is a security key that is derived from the read-only subset. Generating security keys based on read-only subsets can correspond to generating a security key based on a source string that includes read-only subset information and other information, as described below with respect to FIG. 5.

The frontend 406 can send a request 416 to the backend 408 for an edit page for editing an entity instance. In response to the request 416, the backend 408 can generate an initial state 418 that includes a first read-only subset R0 that is a subset of a first complete set of entity instance fields C0. At 420, the backend 408 can generate a first security key K0 based on the read-only subset R0. At 422, the backend 408 can provide a response 424 to the request 416 to the frontend 406 that includes the first complete set of fields C0, the first read-only subset R0, and the first security key K0. A portlet can load at the frontend 406 using data in the response 424, for example.

At 426, a user changes one or more editable fields, including a leading field, using the edit page, for example. The leading field may be specified in an on-change rule. The changing of the one or more editable fields including the leading field results in a changed state 428 that includes a second complete set of fields C1 (e.g., changed from the first complete set of fields C0). The changed state 428 includes a same first read-only subset R0 and a first security key K0 as received from the backend 408 in the response 424.

At 430, the frontend 406 notifies the backend 408 about the change to the leading field, by sending the changed state 428 to the backend 408. The backend 408 receives the changed state 428 as a received state 431. At 432, the backend checks the received R0 read-only subset against the received security key K0 (e.g., by generating a security K' based on the received R0 read-only subset and comparing the generated security key K' to the received K0 security key).

At 434, the backend 408 determines, based on the second complete set of fields C1 in the received state 431, that the value of the leading field has changed. Accordingly, the on-change rule for the leading field is triggered and a new value is generated for a read-only field that is specified in the on-change rule. Accordingly, the backend 408 generates a new state 436 that includes a third complete set of fields C2 (e.g., that includes the updated leading field and the updated read-only field) and a second read-only subset R1 (e.g., that includes the updated read-only field).

At 438, the backend 408 generates a new security key K1 based on the second read-only subset R1. At 440, the backend 408 sends a response 442 to the frontend 406 to the notification sent by the frontend at 430. The response 442 includes the third complete set of fields C2, the second read-only subset R1, and the new security key K1. At 444, the user may make changes to other editable fields (e.g., fields that are not associated with any on-change rule). Accordingly, an updated state 446 includes a fourth complete set of fields C3 (e.g., that includes any changes to editable fields not associated with on-change rules), the second read-only subset R1, and the new security key K1.

At 448, the updated state 446 can be sent by the frontend 406 to the backend 408 in response to a user selecting a save button on the edit page, for example. At 450, the backend checks the received R1 read-only subset against the received security key K1 (e.g., by generating a security K" based on the received R1 read-only subset and comparing the generated security key K" to the received K1 security key). At 452, in response to the security key K" generated based on the R1 read-only subset matching the received K1 security key, the backend 408 save the third complete set of fields C3 (e.g., including the second read-only subset R1) to a backend database, as a persisted state 454.

In some implementations, at 455, the frontend 406 may automatically update the edit page (e.g., by automatically reloading a portlet). At 456, the backend 408 re-generates a security key K1. At 458, the backend 408 provides updated state 460 to the frontend.

Figure 5:
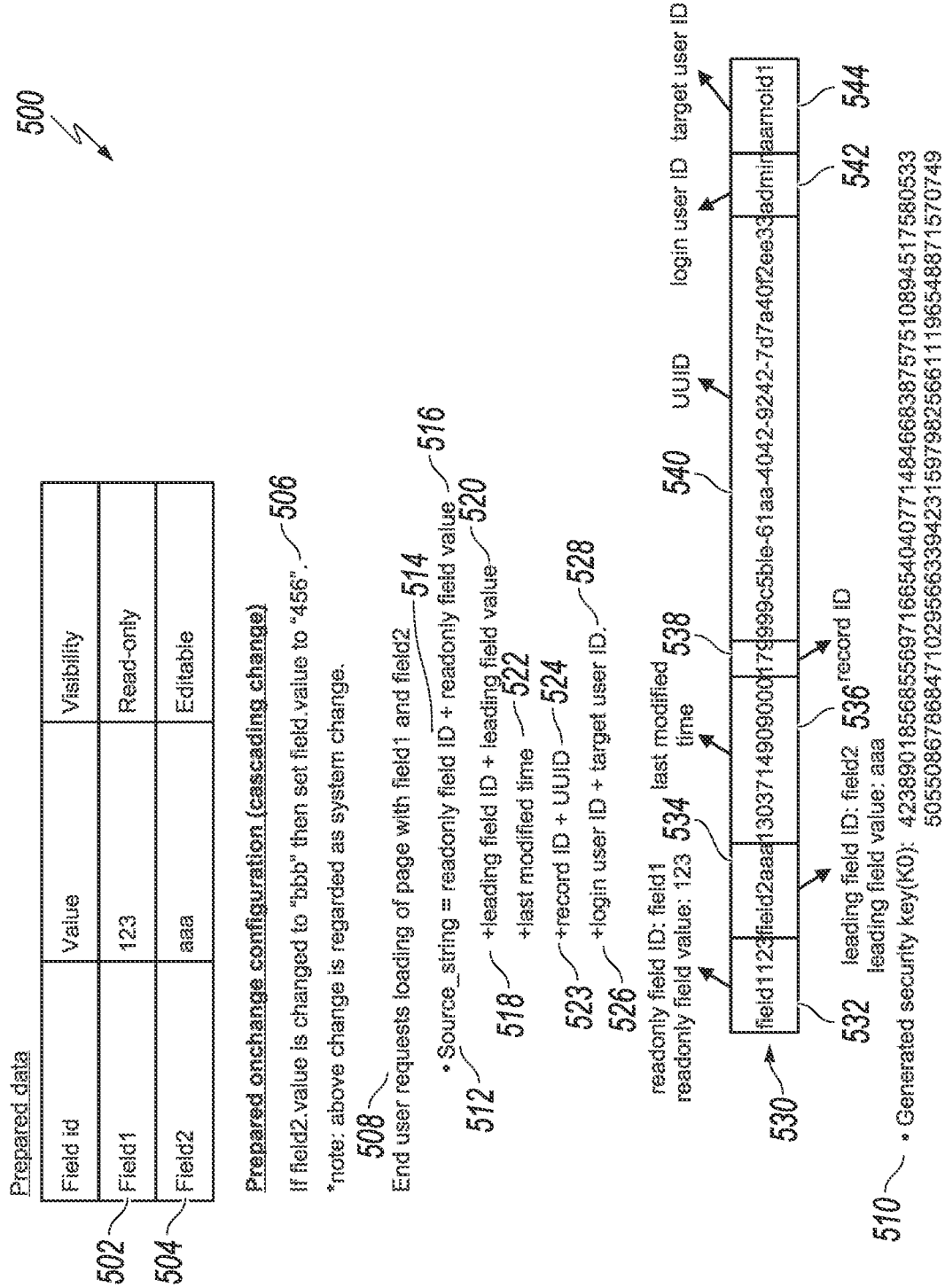
FIG. 5 is a diagram that illustrates generation of a security key based on a source string.

FIG. 5 is a diagram 500 that illustrates generation of a security key based on a source string. A read-only field field1 502 has a current value of "123". An editable field field2 504 has a current value of "aaa". An on-change configuration 506 (e.g., an on-change rule) specifies that if the editable field field2 504 is changed to a value of "bbb" that the system will change the read-only field field1 502 to a value of "456".

In an operation 508, the end user requests loading of an edit page that displays the read-only field field1 502 and the editable field field2 504 (and possibly other field values). The edit page allows the end user to edit the value of the editable field field2 504 but does not allow the end user to edit the value of the read-only field field1 502.

A server (e.g., the server 102) can generate a security key 510 in response to receiving the request to load the edit page and provide the security key 510 to the client device on which the edit page is displayed. The security key 510 can be generated based on a source string 512. The source string 512 can be based on an identifier 514 of the read-only field field1 502, the value 516 of the read-only field field1 502, a leading field identifier 518, a leading field value 520, a last-modified time 522, a record identifier 523, a record UUID (Universally Unique identifier) 524, a login user identifier 526, and a target user identifier 528.

An example source string 530 is displayed. The source string 530 includes a read-only field portion 532 that includes a read-only field identifier and a read-only field value of the read-only field field1 502. The source string 530 includes a leading-field portion 534 that includes a leading-field identifier and a leading-field value of the editable field field2 504. To protect a read-only field whose value or visibility can be changed by an on-change rule, the source string 530 can include, along with read-only field information, the leading field identifier and the leading field value of a leading field used in an on-change rule for the read-only field.

A last modified time 536 can be included in the source string 530. Including the last modified time 536 in the source string 530 can prevent replay attacks. A replay attack can occur when an attacker intercepts a stream of message(s) being sent between two parties and replays the stream to one or more of the parties (e.g., after modifying the stream of message(s)). The attacker can disguise the replayed messages as being from the original sender. The receiving party can mistakenly determine that the intercepted stream is from the originating party. By including the last modified time 536 in the source string, during validation, the last modified time 536 can be verified. If a last modified time other than an expected last modified time is received by the server, the server can deny a save request.

The record identifier 538 and the record UUID 540 can uniquely identify a record that is being edited in the edit page. Including record-identifying information can prevent a hacker from attempting to hack other records in the system. In some cases, such for a record to be added, a record identifier may not exist in the system. The record UUID can 540 be used to identify the record to be added or a newly-added record that does not yet have a record identifier, for example.

The login user identifier 542 and the target user identifier 544 can be included to prevent against user identifier hacking. The login user identifier 542 is an identifier of a user logged into the edit session. The target user identifier 544 can be an identifier of a user that is associated with a record being edited in the edit page. Including the login user identifier 542 in the source string 530 can prevent a hack of login user information. For example, a hacker could attempt to hack a login user identifier to be an identifier of a user (e.g., an administrative user) that has privileges to modify a target user's information. Including the login user identifier 542 in the source string 530 can prevent a hack of login user information. As another example, including the target user identifier 544 can prevent a hacker from posing as another end user so as to edit the end user's information.

The source string 530 can be a plain text value used in a hash operation that is performed to generate the security key 510. The security key 510 can be a signed hash that is generated using the source string 530 and a secret key. For example, the hash can be generated by using a session-based secret key. The server can generate a session-based secret key for use only in the current session. The hash can be generated using an encoded base-64 algorithm, such as SHA (Secure Hash Algorithm) 256. The hash can be generated on a session basis.

Figure 6:
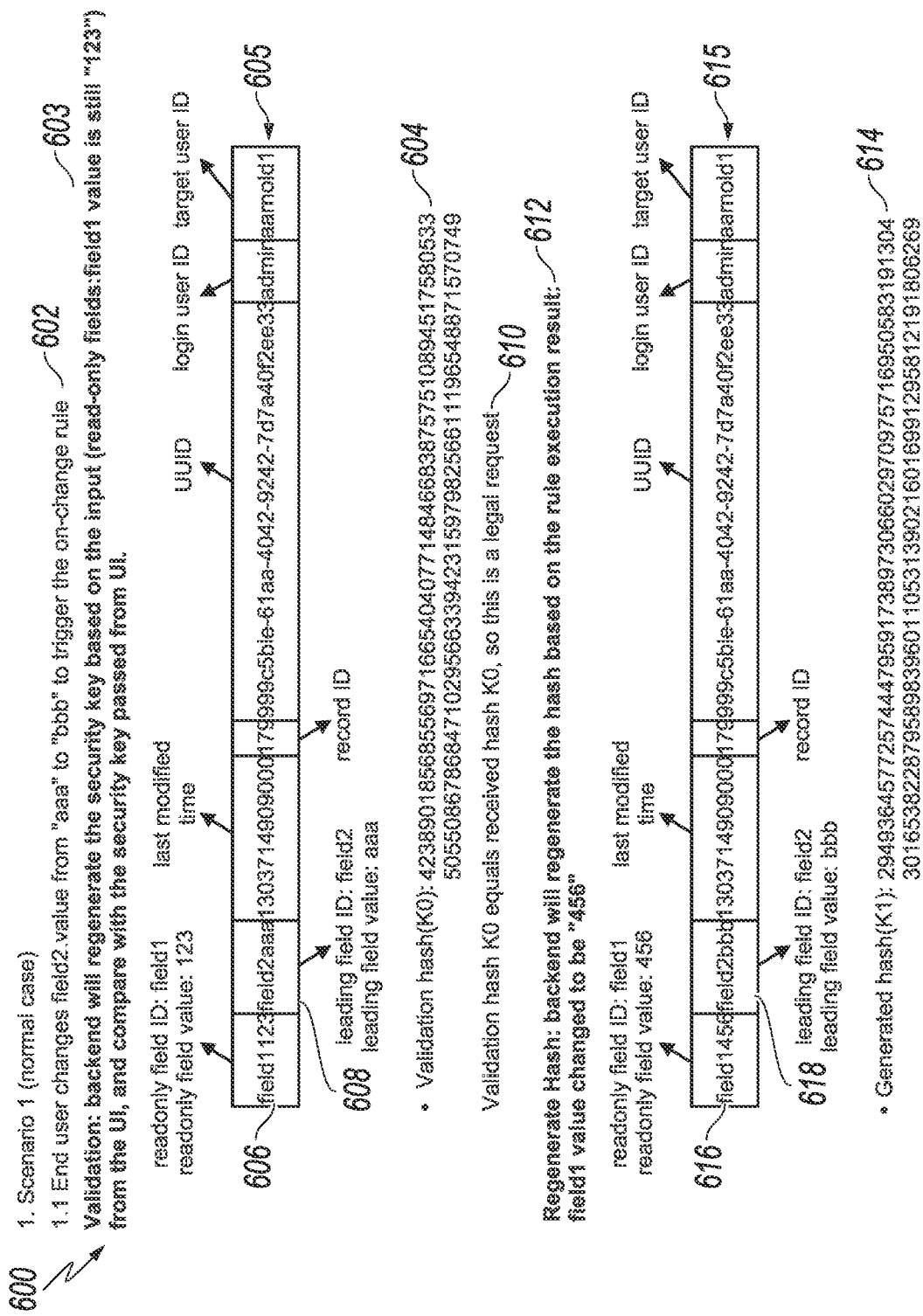
FIGS. 6 and 7 are diagrams that illustrate an on-change scenario in which a valid system change to a read-only field is accepted.
Figure 7:
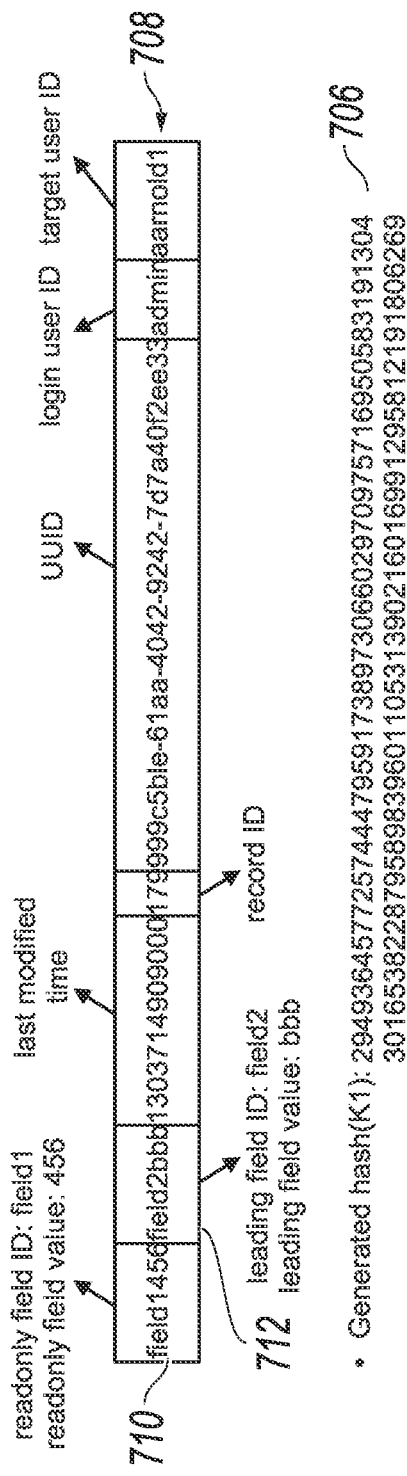

FIGS. 6 and 7 are diagrams 600 and 700 that illustrate an on-change scenario in which a valid system change to a read-only field is accepted. The on-change scenario can be a continuation of the scenario described above with respect to FIG. 5. At 602, the end user uses the edit page to change the value of the editable field field2 from "aaa" to "bbb". The changing of the value of the editable field field2 can trigger the on-change rule specified in the on-change configuration 506.

The client device that is displaying the edit page can send, in an on-change request, the security key the client device previously received from the server (e.g., the security key 510) to the server along with the field data (e.g., the value "123" of the read-only field field1 and the new value "bbb" of the editable field field2). At 603, as a validation step, the server can generate a validation security key K0 604 (e.g., validation hash) based a source string 605 that includes field1 data 606 received from the client device and current (e.g., before-change) information 608 for the editable field field2. The server can compare the validation key K0 to the security key received from the client. At 610, in response to the validation key K0 matching the security key received from the client, the server can accept the on-change request.

At 612, accepting the on-change request can include executing the on-change rule specified on the on-change configuration 506. That is, the value of the read-only field field1 can be changed to "456" based on the new value "bbb" of the editable field field2 (e.g., with the read-only field field1 being a target field that is modified based on a change to the editable field field2 as a leading field). Accepting the on-change request can also include generating a new security key K1 614 based on a source string 615 that includes updated read-only field field1 information 616 and updated editable field field2 information 618. The server can provide the new security key K1 614 to the client device in response to the on-change request.

Referring now to FIG. 7, at 702, the end user selects a save button on the edit page. The client device sends a save request to the server in response to selection of the save button. At 704, the server regenerates a security key K1 706 based on a source string 708 that includes read-only field field1 data 710 and editable field field2 data 712 received from the client device. The server can compare the security key K1 to a security key received from the client with the save request. At 714, in response to the security key K1 matching the security key received from the client, the server can accept the save request.

FIG. 8 is a diagram 800 that illustrates an on-change scenario in which a hacked request is declined. The on-change scenario can be a continuation of the scenario described above with respect to FIG. 5. At 802, similar to the operation 602 described above with respect to FIG. 6, the end user uses the edit page to change the value of the editable field field2 from "aaa" to "bbb". The changing of the value of the editable field field2 can trigger the on-change rule specified in the on-change configuration 506. The server can handle an on-change request as described above for operations 603 and 612 (e.g., the server can generate a new security key K1 803 with a same value as the security key 614, based on updated field1 and field2 values).

At 804, the end user selects a save button on the edit page and sends a save request to the server, but a hacker system intercepts the save request, changes the value of the read-only field field1 to be "789" from a previous value of "456" to create a hacked request, and sends the hacked request to the server. The hacked request includes a copy of the security key K1 803. At 806, the server generates a security key K2 808 based on a security string 810 that includes the hacked value "789" of the read-only field field1 included in the hacked request. At 814, the server compares the security key K2 808 to the copy of the security key K1 803 included in the hacked request. The server can reject the hacked request based on the security key K2 808 not matching the copy of the security key K1 803 included in the hacked request.

Figure 9:
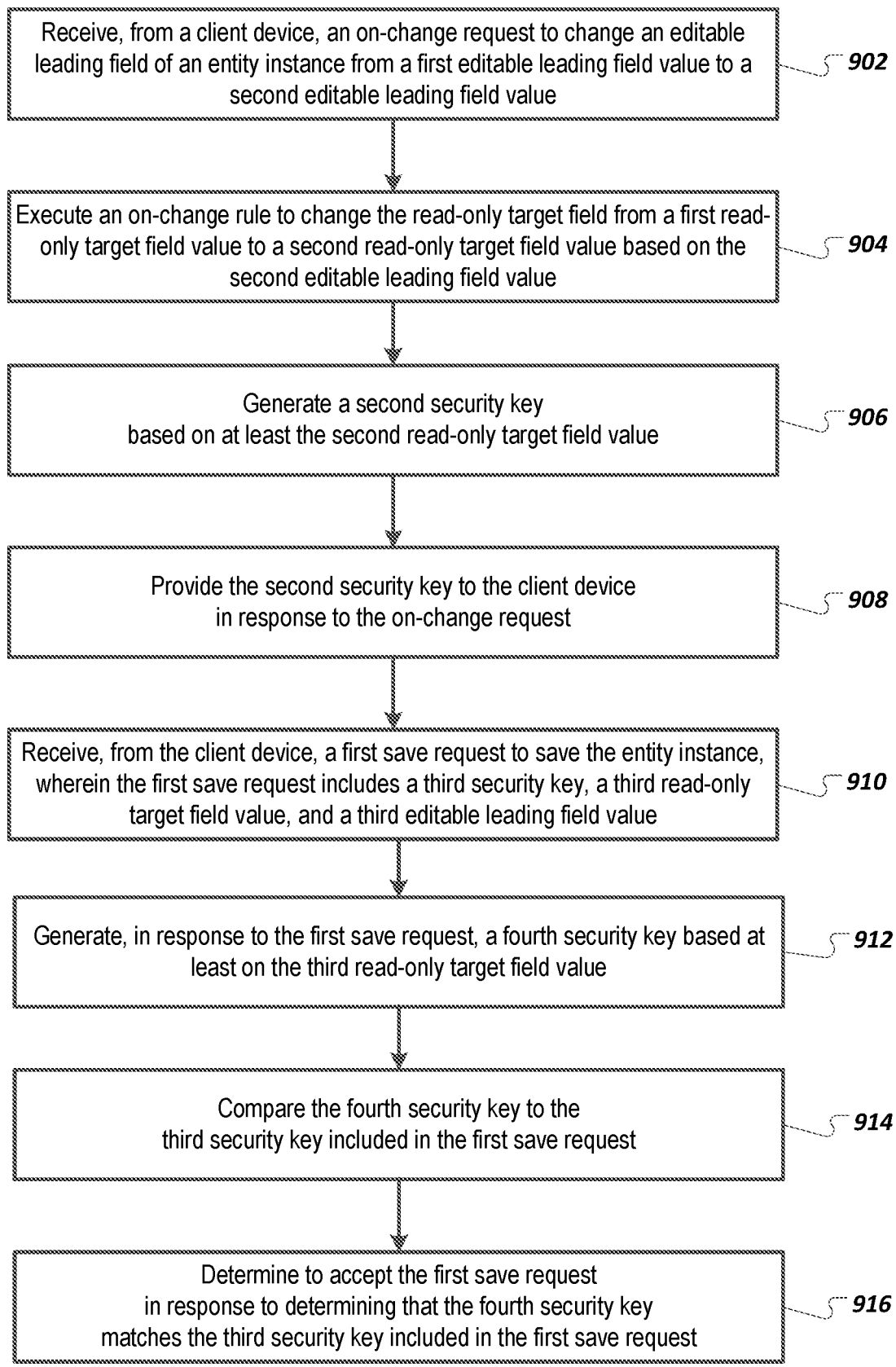
FIG. 9 is a flowchart of an example method for read-only security protection.

FIG. 9 is a flowchart of an example method for read-only security protection. It will be understood that method 900 and related methods may be performed, for example, by any suitable system, environment, software, and hardware, or a combination of systems, environments, software, and hardware, as appropriate. For example, one or more of a client, a server, or other computing device can be used to execute method 900 and related methods and obtain any data from the memory of a client, the server, or the other computing device. In some implementations, the method 900 and related methods are executed by one or more components of the system 100 described above with respect to FIG. 1. For example, the method 900 and related methods can be executed by the read-only security protection engine 126 of FIG. 1.

At 902, an on-change request is received from a client device to change an editable leading field of an entity instance from a first editable leading field value to a second editable leading field value. The editable leading field is referenced in an on-change rule that specifies that a value of a read-only target field of the entity instance is to be changed in response to a change in the editable leading field, and wherein the on-change request includes a first security key, and wherein the client device is not allowed to modify the read-only target field. The first security key can be provided to the client device when an edit page for editing the entity instance is provided to the client device.

At 904, the on-change rule is executed to change the read-only target field from a first read-only target field value to a second read-only target field value based on the second editable leading field value. The first security key can be validated before executing the on-change rule.

At 906, a second security key is generated based on at least the second read-only target field value.

At 908, the second security key is provided to the client device in response to the on-change request.

At 910, a first save request is received from the client device to save the entity instance. The first save request includes a third security key, a third read-only target field value, and a third editable leading field value. For a valid save request, the third security key included in the first save request can match the second security key provided to the client device in response to the on-change request. The first save request can include a change to an editable field that is not a leading field. For an invalid save request, the third security key included in the first save request can be a hacked security key that does not match either the second security key provided to the client device in response to the on-change request or the fourth security key generated in response to the first save request.

At 912, in response to the first save request, a fourth security key is generated based at least on the third read-only target field value. The fourth security key is generated based on the third read-only target field value included in the first save request and the third editable leading field value included in the first save request. The fourth security key can be based on a hash of a source string that includes the third read-only target field value and the third editable leading field value. The fourth security key can be based on the source string and a session-based secret key. The source string can include an identifier of the read-only target field, the third read-only target field value, an identifier of the editable leading field, and the third editable leading field value. The source string can include at least one entity instance identifier, a last modified time of the entity instance, a login user identifier of a user associated with a current session, and a target user identifier, wherein the target user identifier corresponds to a target user associated with the entity instance.

At 914, the fourth security key is compared to the third security key included in the first save request. For in invalid save request: 1) the third read-only target field value can be a first hacked value that does not match the second read-only target field value and 2) the fourth security key might not match the third security key included in the first save request based at least on the first hacked value not matching the second read-only target field value.

At 916, a determination is made to accept the first save request in response to determining that the fourth security key matches the third security key included in the first save request. As another example, a determination can be made to reject the first save request in response to determining that the fourth security key does not match the third security key included in the first save request.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving, from a client device, an on-change request to change an editable leading field of an entity instance from a first editable leading field value to a second editable leading field value, wherein the editable leading field is referenced in an on-change rule that specifies that a value of a read-only target field of the entity instance is to be changed in response to a change in the editable leading field, and wherein the on-change request includes a first security key, and wherein the client device is not allowed to modify the read-only target field;
executing the on-change rule to change the read-only target field from a first read-only target field value to a second read-only target field value based on the second editable leading field value;
generating a second security key based on at least the second read-only target field value;
providing the second security key to the client device in response to the on-change request;
receiving, from the client device, a first save request to save the entity instance, wherein the first save request includes a third security key, a third read-only target field value, and a third editable leading field value;
generating, in response to the first save request, a fourth security key based at least on the third read-only target field value;
comparing the fourth security key to the third security key included in the first save request; and
determining to accept the first save request in response to determining that the fourth security key matches the third security key included in the first save request.

2. The computer-implemented method of claim 1, further comprising determining to reject the first save request in response to determining that the fourth security key does not match the third security key included in the first save request.

3. The computer-implemented method of claim 1, wherein the first security key is provided to the client device when an edit page for editing the entity instance is provided to the client device.

4. The computer-implemented method of claim 1, further comprising validating the first security key before executing the on-change rule.

5. The computer-implemented method of claim 1, wherein the fourth security key is generated based on the third read-only target field value included in the first save request and the third editable leading field value included in the first save request.

6. The computer-implemented method of claim 1, wherein the fourth security key is based on a hash of a source string that includes the third read-only target field value and the third editable leading field value.

7. The computer-implemented method of claim 6, wherein the fourth security key is based on the source string and a session-based secret key.

8. The computer-implemented method of claim 6, wherein the source string includes an identifier of the read-only target field, the third read-only target field value, an identifier of the editable leading field, and the third editable leading field value.

9. The computer-implemented method of claim 6, wherein the source string includes at least one entity instance identifier, a last modified time of the entity instance, a login user identifier of a user associated with a current session, and a target user identifier, wherein the target user identifier corresponds to a target user associated with the entity instance.

10. The computer-implemented method of claim 1, wherein the third security key included in the first save request matches the second security key provided to the client device in response to the on-change request.

11. The computer-implemented method of claim 1, wherein the first save request includes a change to an editable field that is not a leading field.

12. The computer-implemented method of claim 1, wherein the third security key included in the first save request is a hacked security key that does not match either the second security key provided to the client device in response to the on-change request or the fourth security key generated in response to the first save request.

13. The computer-implemented method of claim 1, wherein the third read-only target field value is a first hacked value that does not match the second read-only target field value and wherein the fourth security key does not match the third security key included in the first save request based at least on the first hacked value not matching the second read-only target field value.

14. The computer-implemented method of claim 1, further comprising:
receiving, from the client device and before the on-change request, a second save request, wherein the second save request includes the first security key, the first read-only target field value, and an editable field value of an editable field;
generating a fifth security key based on at least the first read-only target field value;
comparing the fifth security key to the first security key; and
accepting the second save request, including saving the entity instance with the editable field value, in response to determining that the fifth security key matches the first security key.

15. The computer-implemented method of claim 1, further comprising:
receiving, from the client device and before the on-change request, a second save request, wherein the second save request includes the first security key, the first read-only target field value, and an editable field value of an editable field;
generating a fifth security key based on at least the first read-only target field value;
comparing the fifth security key to the first security key; and
rejecting the second save request in response to determining that the fifth security key does not match the first security key.

16. A system comprising:
one or more computers; and
a computer-readable medium coupled to the one or more computers having instructions stored thereon which, when executed by the one or more computers, cause the one or more computers to perform operations comprising:
receiving, from a client device, an on-change request to change an editable leading field of an entity instance from a first editable leading field value to a second editable leading field value, wherein the editable leading field is referenced in an on-change rule that specifies that a value of a read-only target field of the entity instance is to be changed in response to a change in the editable leading field, and wherein the on-change request includes a first security key, and wherein the client device is not allowed to modify the read-only target field;
executing the on-change rule to change the read-only target field from a first read-only target field value to a second read-only target field value based on the second editable leading field value;
generating a second security key based on at least the second read-only target field value;
providing the second security key to the client device in response to the on-change request;
receiving, from the client device, a first save request to save the entity instance, wherein the first save request includes a third security key, a third read-only target field value, and a third editable leading field value;
generating, in response to the first save request, a fourth security key based at least on the third read-only target field value;
comparing the fourth security key to the third security key included in the first save request; and
determining to accept the first save request in response to determining that the fourth security key matches the third security key included in the first save request.

17. The system of claim 16, wherein the operations further comprise determining to reject the first save request in response to determining that the fourth security key does not match the third security key included in the first save request.

18. The system of claim 16, wherein the first security key is provided to the client device when an edit page for editing the entity instance is provided to the client device.

19. A non-transitory, computer-readable medium coupled to one or more processors and having instructions stored thereon which, when executed by the one or more processors, cause the one or more processors to perform operations, the operations comprising:
- receiving, from a client device, an on-change request to change an editable leading field of an entity instance from a first editable leading field value to a second editable leading field value, wherein the editable leading field is referenced in an on-change rule that specifies that a value of a read-only target field of the entity instance is to be changed in response to a change in the editable leading field, and wherein the on-change request includes a first security key, and wherein the client device is not allowed to modify the read-only target field;
- executing the on-change rule to change the read-only target field from a first read-only target field value to a second read-only target field value based on the second editable leading field value;
- generating a second security key based on at least the second read-only target field value;
- providing the second security key to the client device in response to the on-change request;
- receiving, from the client device, a first save request to save the entity instance, wherein the first save request includes a third security key, a third read-only target field value, and a third editable leading field value;
- generating, in response to the first save request, a fourth security key based at least on the third read-only target field value;
- comparing the fourth security key to the third security key included in the first save request; and
- determining to accept the first save request in response to determining that the fourth security key matches the third security key included in the first save request.

20. The computer-readable medium of claim 19, wherein the operations further comprise determining to reject the first save request in response to determining that the fourth security key does not match the third security key included in the first save request.

* * * * *